United States Patent
Petrocelli et al.

(10) Patent No.: US 8,173,090 B2
(45) Date of Patent: May 8, 2012

(54) SORBENT USE WITH OXYFUEL SOUR COMPRESSION

(75) Inventors: Francis Peter Petrocelli, Allentown, PA (US); Kevin Boyle Fogash, Wescosville, PA (US); Vincent White, Ashtead (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/832,204

(22) Filed: Jul. 8, 2010

(65) Prior Publication Data
US 2012/0009107 A1    Jan. 12, 2012

(51) Int. Cl.
B01D 53/50 (2006.01)
B01D 53/56 (2006.01)
B01D 53/74 (2006.01)

(52) U.S. Cl. ........... 423/243.08; 423/393; 423/522; 423/523; 422/168; 422/177; 422/187

(58) Field of Classification Search ......... 423/243.08, 423/393, 522, 523; 422/168, 177, 187
See application file for complete search history.

(56) References Cited

U.S. PATENT DOCUMENTS

| | | | |
|---|---|---|---|
| 3,906,079 A | 9/1975 | Tamaki et al. | |
| 4,425,313 A | 1/1984 | Cooper | |
| 5,312,609 A | 5/1994 | College | |
| 7,416,716 B2 | 8/2008 | Allam et al. | |
| 2001/0009649 A1 | 7/2001 | Tatani et al. | |
| 2004/0071621 A1 | 4/2004 | Tatsuhara et al. | |
| 2004/0208809 A1* | 10/2004 | D'Alesandro | 423/243.08 |
| 2007/0122328 A1 | 5/2007 | Allam et al. | |
| 2008/0050299 A1 | 2/2008 | Bedell et al. | |
| 2008/0173584 A1 | 7/2008 | White et al. | |
| 2008/0173585 A1 | 7/2008 | White et al. | |
| 2008/0176174 A1 | 7/2008 | White et al. | |

FOREIGN PATENT DOCUMENTS

| | | |
|---|---|---|
| CA | 2336436 A | 10/2001 |
| CN | 101306320 A | 11/2008 |
| CN | 101332411 A | 12/2008 |
| CN | 101433801 A | 5/2009 |
| DE | 102008062496 | 6/2010 |
| JP | 9038453 A | 2/1997 |

OTHER PUBLICATIONS

Counce, R. M.; "A Literature Review of Nitrogen Oxide Absorption Into Water and Dilute Nitric Acid;" sponsored by an agency of the US Govenment. Aug. 1977.

(Continued)

Primary Examiner — Timothy Vanoy
(74) Attorney, Agent, or Firm — Willard Jones, II

(57) ABSTRACT

Sulfur dioxide ($SO_2$) is removed from carbon dioxide feed gas comprising $SO_2$ as a contaminant by maintaining the carbon dioxide feed gas at an elevated pressure in contact with an alkaline sorbent for a period of time sufficient to react said alkaline sorbent with $SO_2$. Where $NO_x$, oxygen ($O_2$) and water are also present, not only is the rate of reaction with the sorbent increased, but also additional $SO_2$ is removed by conversion to sulfuric acid, and $NO_x$ is removed as nitric acid. The method has particular application in the removal of $SO_2$ and $NO_x$ from flue gas produced by oxyfuel combustion of a hydrocarbon or carbonaceous fuel.

21 Claims, 3 Drawing Sheets

OTHER PUBLICATIONS

Dillon, et al; "Oxy-Combustion Processes for CO2 Capture from Advanced Supercritical PF and NGCC Power Plant;" presented at GHGT-7 Vancouver, Sep. 2004.

Jordal; et al; "Oxyfuel Combustion for Coal-Fired Power Generation with CO2 Capture-Opportunities and Challenges;" GHGT-7 Vancouver, 2004.

Wilkinson, et al; "Oxyfuel Conversion of Heaters and Boilers for CO2 Capture;" Second National Conference on Carbon Sequestration; Washington DC; May 5-8, 2003.

Liu et al; "Kinetics of the Reaction of Hydrated Lime with SO2 at Low Temperatures: Effects of the Presence of CO2, O2 and Nox" Ind. Eng. Chem. Res. 2008; 47, p. 9878-9881.

Liu et all; Kinetics of the Reaction of Iron Blast Furnace Slag/Hydrated Lime Sorbents with SO2 at Low Temperatures: Effects of the Presence of CO2, O2, and NOx: Ind. Eng. Chem. Res. 2009; 48, p. 8335-8340.

Petrocellli, et al; U.S. App. No. 12/832,096, filed Jul. 8, 2010; "Integration of Catalytic CO2 Oxidation and Oxyfuel Sour Compression."

White et al; U.S. Appl. No. 12/832,095, filed Jul. 8, 2010; "Handling of Acids from Compressed Oxyfuel-Derived CO2."

Wright et al; U.S. Appl. No. 12/832,156, filed Jul. 8, 2010; "Treatment of Flue Gas From an Oxyfuel Combustion Process".

Wright, et al; U.S. Appl. No. 12/832,117, filed Jul. 8, 2010; "Recycle TSA Regen Gas to Boiler for Oxyfuel Operations."

Diamond, Barry Wayne; U.S. Appl. No. 12/832,130, filed Jul. 8, 2010; "Removal of Acid Mists".

* cited by examiner

SORBENT USE WITH OXYFUEL SOUR COMPRESSION

BACKGROUND OF THE INVENTION

The present invention relates generally to a method for purifying carbon dioxide gas. In particular, the present invention relates to a method for removing sulfur dioxide ($SO_2$) from carbon dioxide gas comprising $SO_2$ as a contaminant. The method also removes $NO_x$, if present as a further contaminant, from the carbon dioxide gas. The invention has particular application in the purification of crude carbon dioxide, e.g. flue gas from an oxyfuel combustion process in a pulverized coal fired power station in which sulfur containing carbonaceous or hydrocarbon fuel is combusted in a boiler to produce steam for electric power generation.

The term "$SO_x$" means oxides of sulfur and includes $SO_2$ and sulfur trioxide ($SO_3$). The term "$NO_x$" means oxides of nitrogen and includes primarily nitric oxide (NO) and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapor by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverized coal-fired power boiler is described in a paper entitled "*Oxy-combustion processes for $CO_2$ capture from advanced supercritical PF and NGCC power plants*" (Dillon et al; presented at GHGT-7, Vancouver, September 2004), the disclosure of which is incorporated herein by reference.

Oxyfuel combustion produces raw flue gas containing primarily $CO_2$, together with contaminants such as water vapor; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), NO and $NO_2$ produced as oxidation products from components in the fuel or by combination of $N_2$ and $O_2$ at high temperature. The precise concentrations of the gaseous impurities present in the flue gas depend on factors such as on the fuel composition; the level of $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardize the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapor; $SO_x$; $NO_x$; soluble gaseous impurities such as HCl; and "non-condensable" gases such as $O_2$, $N_2$ and Ar, in order to produce a final $CO_2$ product which will be suitable for storage or use.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulphurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x$/$NO_x$ removal using desulphurization and $NO_x$ reduction technologies is disclosed in "*Oxyfuel Combustion For Coal-Fired Power Generation With $CO_2$ Capture—Opportunities And Challenges*" (Jordal et al; GHGT-7, Vancouver, 2004). Such process could be applied to conventional coal boilers.

FGD scrubbing schemes typically involve reacting the acid gas, $SO_2$, with an alkaline sorbent material at atmospheric pressure to produce sorbent-derived sulfite. Conventional alkaline sorbents include calcium carbonate (limestone), calcium hydroxide (slaked or hydrated lime), and magnesium hydroxide. For example, the reaction taking place in a wet scrubbing process using limestone slurry producing calcium sulfite ($CaSO_3$) can be expressed as:

$$CaCO_{3(s)} + SO_{2(g)} \rightarrow CaSO_{3(s)} + CO_{2(g)}$$

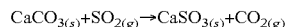

Where the alkaline sorbent used is slaked lime slurry, the reaction taking place also produces calcium sulfite and can be expressed as:

$$Ca(OH)_{2(s)} + SO_{2(g)} \rightarrow CaSO_{3(s)} + H_2O_{(l)}$$

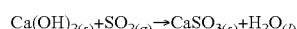

The reaction of magnesium hydroxide with $SO_2$ producing magnesium sulfite may be expressed as:

$$Mg(OH)_{2(s)} + SO_{2(g)} \rightarrow MgSO_{3(s)} + H_2O_{(l)}$$

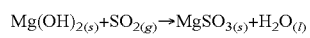

A solution of sodium hydroxide (NaOH), or caustic soda, may also be used as the alkaline sorbent.

Calcium sulfite is typically converted to the more commercially valuable calcium sulfate dihydrate ($CaSO_4.2H_2O$) or gypsum, by the following "forced oxidation" reaction which takes place in the presence of water:

$$CaSO_{3(s)} + \tfrac{1}{2}O_{2(g)} \rightarrow CaSO_{4(s)}$$

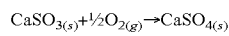

There are many examples of FGD schemes disclosed in the prior art that involve wet scrubbing with alkaline sorbents. An example of one such scheme is disclosed in U.S. Pat. No. 3,906,079 A. All of these schemes appear to operate at atmospheric pressure and produce only the sorbent-derived sulfite in significant quantities. The schemes involve additional processing steps to convert the sorbent-derived sulfite to the corresponding sulfate.

The effects of the presence of $CO_2$, $O_2$ and $NO_x$ in an artificial flue gas on the kinetics of the "sulfation" of blast furnace slag/hydrated lime sorbents at low temperatures and at atmospheric pressure have been studied for a differential fixed bed reactor (Liu and Shih; Ind. Eng. Chem. Res.; 2009; 48 (18), pp 8335-8340; and Liu and Shih; Ind. Eng. Chem. Res.; 2008; 47 (24); pp 9878-9881). The results indicated that, when $O_2$ and $NO_x$ were not present simultaneously in the flue gas, then the reaction kinetics are about the same as that for gas mixtures containing $SO_2$, $O_2$ and $N_2$ only. However, when both $O_2$ and $NO_x$ are present, the $SO_2$/sorbent reaction was greatly enhanced, forming a significant amount of sulfate in addition to sulfite. Liu and Shih propose that the $SO_2$/sorbent reactions take place within a water layer provided on the surface of the solid sorbent and that the enhancement is due to an increase in the number of $NO_2$ molecules absorbed in the water layer, which enhances the oxidation of bisulfite and sulfite ions, which in turn induces more $SO_2$ molecules to be captured into the water layer. Whilst significant amounts of sulfate were produced in the reactions studied by Liu and Shih, it may be observed that that sulfate to sulfite ratio did not exceed 1:1.

US 2007/0122328 A1 (granted as U.S. Pat. No. 7,416,716 B1) discloses the first known method of removing $SO_2$ and $NO_x$ from crude carbon dioxide gas produced by oxyfuel combustion of a hydrocarbon or carbonaceous fuel, in which the removal steps take place in the $CO_2$ compression train of a $CO_2$ recovery and purification system. This process is known as a "sour compression" process since acid gases are compressed with carbon dioxide flue gas. The method comprises maintaining the crude carbon dioxide gas at elevated pressure(s) in the presence of $O_2$ and water and, when $SO_2$ is to be removed, $NO_x$, for a sufficient time to convert $SO_2$ to sulfuric acid and/or $NO_x$ to nitric acid; and separating said sulfuric acid and/or nitric acid from the crude carbon dioxide gas.

There is a continuing need to develop new methods for removing $SO_x$ and, where present, $NO_x$ from carbon dioxide gas, and particularly from crude carbon dioxide gas such as flue gas produced in an oxyfuel combustion process such as that involved in a pulverized coal-fired power boiler.

BRIEF SUMMARY OF THE INVENTION

It is an object of the present invention to develop a new method for removing $SO_2$ and, where present, $NO_x$ from carbon dioxide gas, particularly from flue gas from an oxyfuel combustion process.

It is an object of preferred embodiments of the present invention to improve the capacity and rate of adsorption of solid alkaline sorbents in conventional FGD processes.

It is another object of preferred embodiments of the present invention to reduce the size of absorption column systems in conventional FGD processes.

It is further object of preferred embodiments of the present invention to improve the methods disclosed in US 2007/0122328 A1 by (i) reducing the size of the reactor system within which carbon dioxide gas is maintained at elevated pressure(s) in the presence of $O_2$ and water for a period of time sufficient to convert $SO_2$ to sulfuric acid and NO to nitric acid, and/or (ii) reducing or even eliminating the waste acid condensate.

According to a first aspect of the present invention, there is provided a method for removing $SO_2$ from a carbon dioxide feed gas comprising $SO_2$ as a contaminant, said method comprising:

maintaining said carbon dioxide feed gas at an elevated pressure in contact with an alkaline sorbent in the presence of $O_2$ for a period of time at least sufficient to react said alkaline sorbent with $SO_2$ and produce $SO_2$-depleted carbon dioxide gas and a mixture of sorbent-derived sulfate and sorbent-derived sulfite; and separating said mixture of sorbent-derived sulfate and sorbent-derived sulfite from said $SO_2$-depleted carbon dioxide gas, or from a $SO_2$-depleted carbon dioxide gas derived therefrom, to produce a separated $SO_2$-depleted carbon dioxide gas.

The present method has particular application in removing $SO_2$ and $NO_x$ from flue gas generated by oxyfuel combustion of hydrocarbon fuel or carbonaceous fuel.

The present method substantially reduces the concentration of $SO_2$ and, where present, $NO_x$ in carbon dioxide gas such as flue gas. The method can be integrated with a conventional FGD system thereby potentially significantly reducing the size of this system. In addition, the Inventors have discovered that operating at elevated pressure significantly increases the sorbent capacity and rate of adsorption. Thus, integration of FGD sorbent technology with the technology disclosed in US 2007/0122328 A1 enables the design of a smaller reactor system overall which in turn reduces capital and operating costs. Further, in preferred embodiments, not only is the degree of conversion of sorbent to sorbent-derived sulfate and sulfite increased, but the sulfate:sulfite ratio is also increased substantially.

According to a second aspect of the present invention, there is provided apparatus for removing $SO_2$ from a carbon dioxide feed gas comprising $SO_2$ as a contaminant, said apparatus comprising:

a compressor arrangement for compressing said carbon dioxide feed gas to an elevated pressure;

a reactor system for maintaining said carbon dioxide feed gas at said elevated pressure in contact with an alkaline sorbent in the presence of $O_2$ for a period of time sufficient to produce $SO_2$-depleted carbon dioxide gas and a mixture of sorbent-derived sulfate and sorbent-derived sulfite; and a conduit arrangement for feeding carbon dioxide feed gas at said elevated pressure from said compressor arrangement to said reactor system;

a separator system for separating said mixture of sorbent-derived sulfate and sorbent-derived sulfite from said $SO_2$-depleted carbon dioxide gas, or from a $SO_2$-depleted carbon dioxide gas derived therefrom, to provide a separated $SO_2$-depleted carbon dioxide gas.

DETAILED DESCRIPTION OF THE INVENTION

Figure 1:
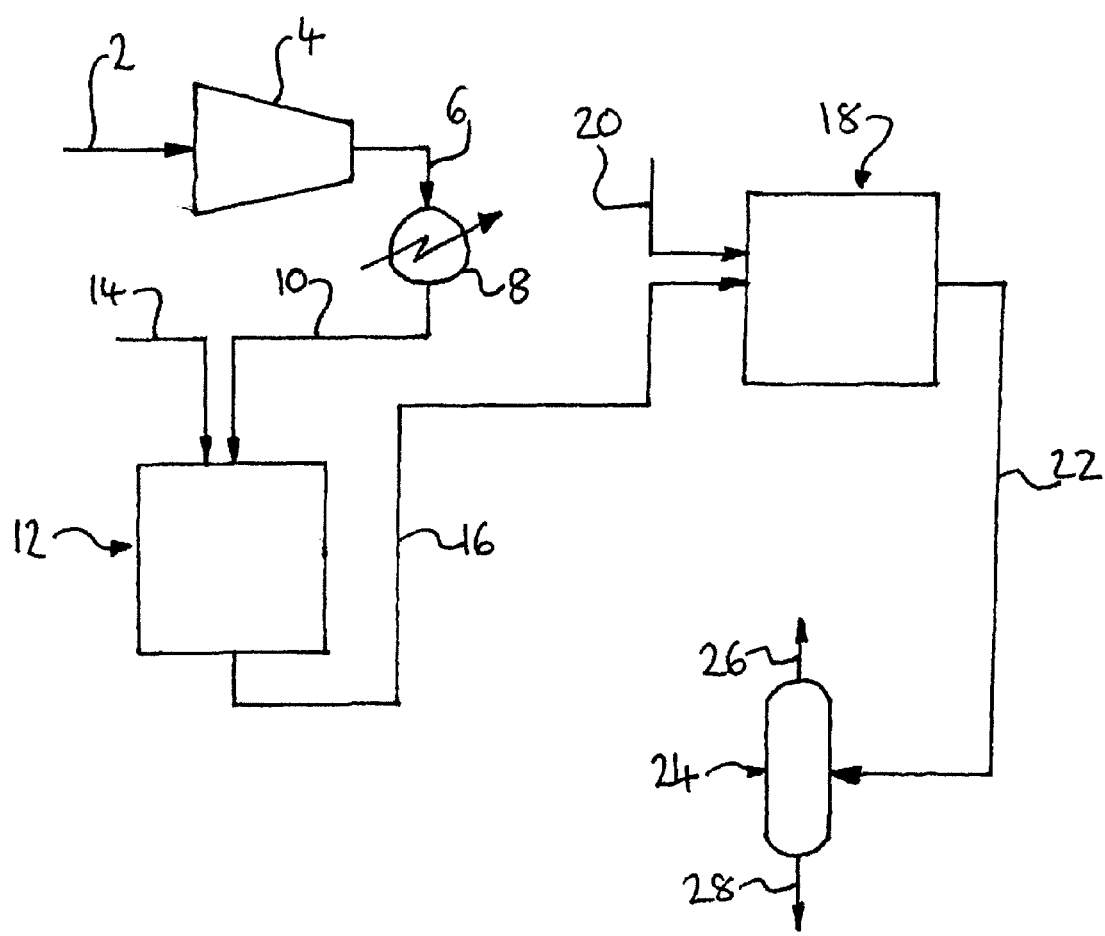
FIG. 1 is a flow sheet depicting one embodiment of the present invention.

The method comprises maintaining the carbon dioxide feed gas at an elevated pressure in contact with an alkaline sorbent in the presence of $O_2$ for a period of time at least sufficient to react said alkaline sorbent with $SO_2$ (hereinafter the "$SO_2$/sorbent reaction") and produce $SO_2$-depleted carbon dioxide gas and a mixture of sorbent-derived sulfate and sorbent-derived sulfite; and separating the mixture of sorbent-derived sulfate and sorbent-derived sulfite from the $SO_2$-depleted carbon dioxide gas, or from a $SO_2$-depleted carbon dioxide gas derived therefrom, to produce a separated $SO_2$-depleted carbon dioxide gas.

The method is primarily intended as an alternative or improved method to that disclosed in US 2007/0122328 A1 for removing $SO_2$ and $NO_x$ from flue gas generated by oxyfuel combustion of a hydrocarbon or carbonaceous fuel within, or preferably downstream of, a $CO_2$ compression train in a $CO_2$ recovery and purification system.

It should be noted that the percentages indicated for the various components in gas streams discussed below are approximate molar percentages (mol. %) calculated on a dry basis. In addition, all pressures provided below are absolute pressures and not gauge pressures.

The Inventors believe that carrying out the $SO_2$/sorbent reaction at elevated pressure forces more $SO_2$ and $O_2$ molecules into the condensed phase and that the higher concentrations of the components in the condensed phase improve not only the capacity of the sorbent but also the rate of reaction, thereby resulting in the production of more sulfate and sulfite overall when compared to an equivalent reaction at atmospheric pressure.

In addition, the Inventors believe that carrying out the $SO_2$/sorbent reaction at elevated pressure also results in the production of a mixture of sulfate and sulfite having a higher sulfate:sulfite ratio when compared to an equivalent reaction at atmospheric pressure. In this connection, the Inventors understand that sulfite ions (i.e. $SO_3^{2-}$ from deionization of absorbed $SO_2$) are converted to sulfate ions ($SO_4^{2-}$) in the presence of dissolved $O_2$, via the following reaction:

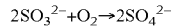

$$2SO_3^{2-} + O_2 \rightarrow 2SO_4^{2-}$$

and that the formation of sulfate ions according to this equilibrium reaction is favored thermodynamically. The elevated pressure means that there is a higher concentration of $O_2$ in the condensed phase which promotes formation of the sulfate ions according to this equilibrium. The need for a subsequent forced oxidation step to produce sorbent-derived sulfate is thereby reduced or, in some embodiments, may even be eliminated.

The method typically removes over 80% of the $SO_2$ contaminant in the carbon dioxide feed gas and, in most embodiments, the method removes over 90% of the $SO_2$ contaminant in the feed gas. In some embodiments, the method removes substantially all (e.g. >95%) of the $SO_2$ contaminant in the carbon dioxide feed gas to produce substantially $SO_2$-free carbon dioxide gas.

The method is suitable to purify carbon dioxide containing $SO_2$ as a contaminant from any source. However, in preferred embodiments, the carbon dioxide gas is, or is derived from, flue gas produced by combustion of a fuel selected from the group consisting of hydrocarbon fuels such as natural gas, and carbonaceous fuels such as coal. The method has particular application for removing $SO_2$ from flue gas produced by oxyfuel combustion of a sulfur-containing fuel, particularly coal.

Flue gas generated in an oxyfuel combustion process usually contains carbon dioxide as the major component, with $SO_x$, $NO_x$ and the non-condensable gases $O_2$, $N_2$ and Ar, with Kr and Xe being present only in very small quantities. $SO_x$ is produced by the combustion of elemental sulfur and/or sulfur-containing compounds present in the fuel. $O_2$ is present in the flue gas from excess $O_2$ used in the combustion and from air ingress into the combustion unit which is also responsible for the presence of $N_2$, Ar, Kr and Xe in the flue gas. $NO_x$ is produced by reaction $N_2$ with $O_2$ in the combustion unit.

Further components in the flue gas include solid particulates such as fly ash and soot; water; CO; HCl; $CS_2$; $H_2S$; HCN; HF; volatile organic compounds (VOCs) such as $CHCl_3$; metals including mercury, arsenic, iron, nickel, tin, lead, cadmium, vanadium, molybdenum and selenium; and compounds of these metals.

Flue gas from the combustor is typically washed with water to remove particulates (such as soot and/or fly ash) and water soluble components (such as HF, HCl and/or $SO_3$). Additionally, the flue gas may be filtered, using equipment such as a baghouse or electrostatic precipitator, to enhance particulate removal. Since the flue gas is typically at atmospheric pressure, it is then compressed after washing to the elevated pressure to form the carbon dioxide feed gas to be purified by the method. However, if the feed gas originates from a source, such as a pressurized oxyfuel combustion system, that is already at the required elevated pressure, then compression is not required.

Where the carbon dioxide gas is produced in an oxyfuel combustion process, the method usually involves the combustion of the fuel in pure $O_2$ or an $O_2$-rich gas, e.g. a gas comprising at least 80% $O_2$, optionally with recycled flue gas from the combustion process to moderate the temperature of combustion and control heat flux.

The method may be used to remove $SO_2$ and, optionally, $NO_x$ from carbon dioxide feed gas having a flow rate from 200 kmol/h to 40,000 kmol/h which flow rates are typical for flue gas generated in an oxyfuel combustion process.

The method may be used to remove $SO_2$ from a stream of otherwise pure $CO_2$ gas. However, the method has particular application in removing $SO_2$ from "impure" carbon dioxide gas, e.g. carbon dioxide gas having from about 90% to about 95% $CO_2$, and more particularly in removing $SO_2$ from "crude" carbon dioxide gas, e.g. carbon dioxide feed gas having from about 40% to about 90% $CO_2$, such as flue gas from an oxyfuel combustion process. In preferred embodiments, the carbon dioxide feed gas has from about 60% to about 90% $CO_2$; and preferably from about 65% to about 85% $CO_2$.

The amount of $SO_2$ contaminant in the feed gas is usually more than 50 ppm. The amount of $SO_2$ contaminant in the feed gas is usually no more than about 10,000 ppm. The amount of $SO_2$ contaminant in the feed gas is typically from about 100 ppm to about 5,000 ppm.

$O_2$ may be added to the feed gas to provide the $O_2$ necessary to produce the sorbent-derived sulfate. However, in embodiments where the carbon dioxide feed gas is, or is derived from, flue gas from a combustion process, at least sufficient (and often excess) $O_2$ is usually present in the carbon dioxide feed gas such that additional $O_2$ from an external source is not typically required. In such embodiments, the amount of $O_2$ in the feed gas is usually from about 0.1% to about 15%, e.g. from about 1% to about 8%, of the feed gas.

The term "elevated pressure" is intended to mean a pressure that is significantly greater than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The elevated pressure is usually at least 2 bar (0.2 MPa), e.g at least 3 bar (0.3 MPa) or at least 5 bar (0.5 MPa). The elevated pressure is usually no more than about 100 bar (10 MPa) and preferably no more than about 50 bar (5 MPa). In preferred embodiments, the elevated pressure is from about 5 bar to about 30 bar (0.5 MPa to 3 MPa).

Where the alkaline sorbent is soluble in water, the alkaline sorbent may be used in the form of an aqueous solution. Soluble alkaline sorbent include Group I metal hydroxides, e.g. sodium hydroxide (caustic soda).

Alternatively, the alkaline sorbent may be used in the form of a solid. In these embodiments, the alkaline sorbent may be added to the carbon dioxide feed gas in a dry state entrained within a motive gas, e.g. air, nitrogen, carbon dioxide, or recycled flue gas. However, if the alkaline sorbent is essentially insoluble in water, then it is typically added in the form of a wet slurry with water.

Suitable alkaline sorbents may be selected from the group consisting of Group II metal carbonates such as calcium carbonate (limestone), magnesium carbonate, and calcium magnesium carbonate (dolomite); Group II metal hydroxides such as calcium hydroxide (slaked or hydrated lime) and magnesium hydroxide; Group II metal oxides such as calcium oxide (quicklime) or magnesium oxide (magnesia); fly ash; and blast furnace slag. Combinations of sorbents may be used. In some preferred embodiments, the solid sorbent is limestone in the form of a wet slurry with water.

The Inventors believe that, provided the alkaline sorbent contains cations, e.g. calcium ($Ca^{2+}$), magnesium ($Mg^{2+}$) or sodium ($Na^+$), capable of forming stable compounds with sulfite ($SO_3^{2-}$) and sulphate ($SO_4^{2-}$) anions, then a mixture of sorbent derived sulfite and sulphate compounds will be formed.

Where limestone is used as the alkaline sorbent, the $SO_2$/sorbent reaction may be expressed as follows:

$$2CaCO_3 + 2SO_2 + \tfrac{1}{2}O_2 \rightarrow CaSO_3 + CaSO_4 + 2CO_2 \quad (a)$$

Where slaked lime is used as the alkaline sorbent, the $SO_2$/sorbent reaction may be expressed as follows:

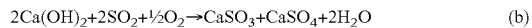
$$2Ca(OH)_2 + 2SO_2 + \tfrac{1}{2}O_2 \rightarrow CaSO_3 + CaSO_4 + 2H_2O \quad (b)$$

Where magnesium hydroxide is used as the alkaline sorbent, the $SO_2$/sorbent reaction may be expressed as follows:

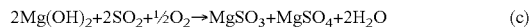
$$2Mg(OH)_2 + 2SO_2 + \tfrac{1}{2}O_2 \rightarrow MgSO_3 + MgSO_4 + 2H_2O \quad (c)$$

The period of time sufficient to react the alkaline sorbent with $SO_2$ is typically at least 1 s or no more than 100 s, e.g. from about 1 s to about 100 s, or from about 1 s to about 25 s, or from about 1 s to about 10 s.

The carbon dioxide feed gas is maintained in contact with the alkaline sorbent at a reaction temperature from about ambient temperature to no more than the acid dew point at the elevated pressure. The "acid dew point" is a conventional term in the art referring to the temperature at which reaction conditions favor production of inorganic acid as a liquid, e.g. from the gas phase equilibrium reaction of $SO_3$ and water. The acid dew point is dependent on pressure and the concentration of other components such as $SO_3$ (and $NO_x$), and a higher pressure (or a higher concentration of the other component(s)) means a higher dew point. Table 1 provides some examples from the literature (Oil & Gas Journal; Vol. 108; Issue 7; 22 Feb. 2010) of how acid dew point varies with pressure, water and $SO_3$ concentrations.

TABLE 1

| Pressure bar (MPa) | Dew point (° C.) 5% $H_2O$, 5000 ppm $SO_3$ | Dew point (° C.) 20% $H_2O$, 5000 ppm $SO_3$ | Dew point (° C.) 5% $H_2O$, 10000 ppm $SO_3$ |
|---|---|---|---|
| 1 (0.1) | 194 | 204 | 201 |
| 10 (1) | 233 | 242 | 240 |
| 30 (3) | 250 | 259 | 257 |

The reaction temperature is typically no more than 300° C. and is usually from ambient temperature to about 275° C. The reaction temperature may be more than ambient temperature, e.g. at least 40° C., and may be from about 40° C. to about 275° C. Preferred ranges for the reaction temperature may be from ambient temperature to 150° C., e.g. from about 20° C. to about 150° C. or from about 20° C. to about 100° C.

The separated $SO_2$-depleted carbon dioxide gas may comprise residual $SO_2$. In such cases, the separated $SO_2$-depleted carbon dioxide gas may be further processed to remove residual $SO_2$. In this connection, the gas may be contacted at elevated temperature with a catalyst for oxidizing $SO_2$ in the presence of $O_2$ to convert $SO_2$ to $SO_3$ and produce an $SO_3$-enriched carbon dioxide gas, which may then be contacted with water to produce sulfuric acid and an at least substantially $SO_2$-free carbon dioxide gas.

In some embodiments, $NO_x$ is not present when the carbon dioxide feed gas is maintained at elevated pressure in contact with the alkaline sorbent. For example, in some embodiments, the feed gas comprising $SO_2$ may not comprise $NO_x$ in the first place. In other embodiments, $NO_x$ may be present originally but is removed, e.g. by Selective Catalytic Reduction (SCR) after suitable pressure and/or temperature adjustment, to produce the feed gas.

In preferred embodiments, the carbon dioxide feed gas is maintained at said elevated pressure in contact with said alkaline sorbent in the presence of $NO_x$ and water. The presence of $NO_x$ promotes the reaction of $SO_2$ with the alkaline sorbent in the presence of $O_2$ in accordance with the findings of Liu and Shih (2009), the disclosure of which is incorporated herein by reference. However, the Inventors have discovered that the $SO_2$/sorbent reaction in the present invention is further enhanced, over and above that extent determined by Liu and Shih, since the reaction takes place at elevated pressure.

Without wishing to be bound by any particular theory, the Inventors believe that the further enhancement is because even more $NO_2$ molecules are forced into the condensed phase at the higher pressure which results not only in a corresponding increase in the extent to which bisulfite and sulfite ions are oxidized, but also in a corresponding increase in the number of $SO_2$ molecules captured into the condensed phase.

In addition, NO is converted to nitric acid and $SO_2$ is converted to sulfuric acid, in the presence of $O_2$ and water, by the following series of reactions which are referred to herein as "sour compression" reactions:

$$2NO + O_2 \leftrightarrow 2NO_2 \quad (i)$$

$$2NO_2 + H_2O \leftrightarrow HNO_2 + HNO_3 \quad (ii)$$

$$3HNO_2 \leftrightarrow HNO_3 + 2NO + H_2O \quad (iii)$$

$$NO_2 + SO_2 \leftrightarrow NO + SO_3 \quad (iv)$$

$$SO_3 + H_2O \rightarrow H_2SO_4 \quad (v)$$

Following extensive studies (Counce, R. M. (1977), "*A literature review of nitrogen oxide absorption into water and dilute nitric acid*", Technical Report ORNL/TM-5921, Oak Ridge National Laboratory), it has been determined that the rate of reaction (i) is increased as the reaction pressure increases. The Inventors realized that carrying out the present method at elevated pressure improves the rate of reaction (i). In particular, the elevated pressure in these embodiments is preferably at least about 3 bar (0.3 MPa), which the Inventors have determined is the pressure threshold at which the rate of reaction (i) becomes commercially more useful.

Further details of the sour compression reactions and of suitable sour compression reactor systems are provided in US 2007/0122328 A1, the disclosure of which is incorporated herein by reference.

Residence time in a reactor system (i.e. contact time or "hold up" time) determines the degree or extent of the sour compression reactions. In this connection, the period of time required for converting $NO_x$ to nitric acid is typically longer than that required for converting $SO_2$ to sulfuric acid. This period of time is usually more than 5 s, e.g. more than about 10 s or more than about 20 s. The period of time is usually no more than 1000 s, and preferably no more than 600 s. The period of time may be from 5 s to about 600 s, e.g. from about 10 s to about 500 s or from about 15 s to about 200 s.

Since the period of time required for the sour compression reactions is typically significantly more than that for the $SO_2$/sorbent reactions, the total period of time required for both reactions to occur is the period of time required for the sour compression reactions. In this connection, the sour compression reactions start as soon as the feed gas is at the elevated pressure. Thus, if a single reactor is used for both the $SO_2$/sorbent reaction and the sour compression reactions, then the residence time in that reactor is the period of time required for the sour compression reactions to occur. If, on the other hand, a first reactor is used for the $SO_2$/sorbent reaction and a second reactor is used for the bulk of the sour compression reactions, then the residence time in the first reactor is the period of time required for the $SO_2$/sorbent reaction to take place, and the residence time in the second reactor is period of time required for the sour compression reactions less the period of time required for the $SO_2$/sorbent reaction. In this way, the combined residence time in the two reactors is at least the period of time required for the sour compression reactions.

Where the $SO_2$/sorbent reaction take place at elevated pressure in the presence of $NO_x$ and water, $SO_2$ is removed from the feed gas not only by enhanced reaction with the alkaline sorbent but also by conversion to sulfuric acid. In such embodiments, the method further produces an aqueous mixed acid solution comprising nitric and sulfuric acids, for separation from the $SO_2$-depleted carbon dioxide gas, or from said gas derived therefrom.

The production of sulfuric acid is beneficial in that the acid promotes the forced oxidation of sorbent-derived sulfite to produce the corresponding sulfate which may be more commercially valuable. For example, where limestone is used as the sorbent and a mixture of calcium sulfite and calcium sulfate is produced, the sulfuric acid promotes oxidation of the sulfite to the sulfate as follows:

$$2CaSO_3 + H_2SO_4 \rightarrow Ca(HSO_3)_2 + CaSO_4 \quad (e)$$

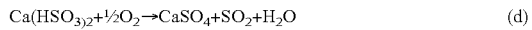
$$Ca(HSO_3)_2 + \tfrac{1}{2}O_2 \rightarrow CaSO_4 + SO_2 + H_2O \quad (d)$$

Thus, in the preferred embodiments of the present invention in which the $SO_2$/sorbent reaction takes place in the presence of $NO_x$ and water, not only is a mixture of sorbent-derived sulfite and sulfate compounds produced, but the proportion of sulfate in the mixture is increased significantly. In some embodiments, the "internal" forced oxidation reaction resulting from the presence of sulfuric acid as a product of the sour compression reactions means that only an insignificant amount of sorbent-derived sulfite is left behind in the mixture, thereby eliminating the need for a separate forced oxidation reaction to convert the sulfite.

Typically, the sorbent-derived sulfate forms the majority of the sulfate/sulfite mixture. Thus, the mixture typically has a sulfate:sulfite ratio of more than 1:1. The mixture may have a sulfate:sulfite ratio of at least 1.5:1, e.g. at least 2:1, or at least 5:1. Effectively, there is no upper limit on the sulfate:sulfite ratio since, in some embodiments, essentially no sulfite is left behind after the "internal" forced oxidation reaction. However, by way of example, the upper limit of the ratio may be about 10000:1, e.g. about 1000:1, or about 100:1. The sulfate:sulfite ratio may be from more than 1:1 to about 10000:1, e.g. more than 1:1 to greater than 100:1, or about 1.5:1 to about 100:1, or about 2:1 to about 100:1.

In such embodiments, the NOx is typically present as a further contaminant in the carbon dioxide feed gas, particularly if the carbon dioxide feed gas is, or is derived from, flue gas produced by oxyfuel combustion of a hydrocarbon fuel or a carbonaceous fuel. The method removes $NO_x$ in addition to $SO_2$ from the carbon dioxide feed gas and produces $SO_2$-depleted, $NO_x$-lean carbon dioxide gas.

Where the feed gas comprises $NO_x$ as a further contaminant, the method typically removes at least 30 mol. %, e.g. at least 40 mol. % and, in some embodiments, at least 50 mol. %, of the $NO_x$ contaminant. In some embodiments, the method removes from 30 mol. % to about 90 mol %, e.g. from about 35 mol. % to 80 mol. %, of the $NO_x$ contaminant.

Where the method is integrated with an oxyfuel combustion process using coal as fuel, mercury will typically be present in the carbon dioxide gas as a further contaminant (based on typical coal compositions). Injected sorbent is usually effective in removing impurities such as elemental mercury (and trace metals and halides). However, a further advantage of these embodiments of the present invention is that removal of any elemental mercury or mercury compounds present as further contaminant(s) in the carbon dioxide gas will be enhanced, since elemental mercury in the vapor phase will be converted to mercuric nitrate and mercury compounds react readily with nitric acid. Typical nitric acid concentrations in these embodiments of the process will be sufficient to remove all of the mercury from the carbon dioxide gas, either by reaction or dissolution.

Further $O_2$ may be added to the carbon dioxide gas from an external source to provide the $O_2$ necessary to convert $NO_x$ to nitric acid. However, in embodiments where the carbon dioxide feed gas is, or is derived from, flue gas from a combustion process, at least sufficient (and often excess) $O_2$ is usually present as a contaminant in the carbon dioxide feed gas and additional $O_2$ from an external source is not typically required.

All of the water required to convert $NO_x$ to nitric acid may be provided internally, e.g. having been produced in a combustion process and already being present as a further contaminant of the carbon dioxide feed gas, and/or added in a flue gas washing step. An embodiment in which no further water is added from an external source may be where the alkaline sorbent is added to the feed gas entrained within a motive gas. However, water from an external source is typically added to the feed gas, particularly in embodiments where the alkaline sorbent is added to the feed gas in the form of an aqueous slurry.

In preferred embodiments, $O_2$ and water are present as further contaminants in the carbon dioxide feed gas, with or without the addition of further $O_2$ and/or water from an external source.

Separated $SO_2$-depleted, $NO_x$-lean carbon dioxide gas typically comprises residual $NO_x$ and may comprise residual $SO_2$. In such cases, the separated $SO_2$-depleted $NO_x$-lean carbon dioxide gas may be further processed to remove residual $SO_2$ and/or residual $NO_x$.

Where there is residual $SO_2$ and $NO_x$ to be removed, the gas may be maintained at said elevated pressure in the presence of $O_2$ and water for a sufficient time to convert $SO_2$ to sulfuric acid and $NO_x$ to nitric acid, and the aqueous mixed acid solution separated from the gas. A suitable process is disclosed in US 2007/0122328 A1, the disclosure of which is incorporated herein by reference.

Suitable reactor systems of sour compression reactions include at least one pressurizable reactor vessel such as a pipe or duct; a tank; an absorption column; a wet scrubbing tower; fluidized or moving bed; packed tower or column; and a Venturi scrubber. These reactor systems may be used in combination with conventional gas/liquid separation arrangements.

Where the reactor system comprises a countercurrent gas/liquid contact column, acid condensate may be removed from the bottom of the column, pumped, cooled and fed as reflux to the top of the column.

The reactor system may comprise a single pressurizable reactor vessel for operation at a single elevated pressure within the range of suitable pressures. In other embodiments, the reactor system may comprise at least two (same or different) pressurizable reactor vessels for operation at either the same or different elevated pressures. Where there are at least two reactor vessels for operation at different elevated pressures, a gas compression arrangement may be provided to compress the gaseous effluent from the elevated operating pressure of a first vessel to the elevated operating pressure of a second vessel. The gas compression arrangement may be at least one stage of a multiple stage gas compressor. Where both $SO_2$ and $NO_x$ are present as contaminants in the carbon dioxide gas to be processed in such embodiments, both columns usually produce mixed acid condensate with the first column producing predominantly sulfuric acid condensate and the second column producing predominantly nitric acid condensate.

Alternatively, residual $SO_2$ and $NO_x$ may be removed by reducing $NO_x$ to $N_2$ in a Selective Catalytic Reaction (SCR) with ammonia and by oxidizing $SO_2$ catalytically to produce $SO_3$ which then reacts with water to produce sulfuric acid which is then condensed out of the gas. A suitable process is disclosed in U.S. Pat. No. 4,781,902 A, the disclosure of which is incorporated herein by reference. Where residual $NO_x$ only is to be removed, then a SCR with ammonia may be used to reduce the $NO_x$ to $N_2$.

In some embodiments, the carbon dioxide feed gas comprising $SO_2$ as a contaminant may already be at the elevated pressure, e.g. flue gas from a pressurized oxyfuel combustion system. However, in most embodiments, the carbon dioxide gas is compressed to produce the carbon dioxide feed gas at said elevated pressure. The gas may be compressed in a single stage or in more than one stages, with or without interstage cooling using heat exchangers. If interstage cooling is used, then means (e.g. "knockout" pots) may be provided to capture and remove any condensate that is formed during the compression step.

The temperature of the feed gas after compression may range from ambient to about 500° C. If the gas is compressed in multiple stages, then the extent to which the gas is intercooled may be calculated and carefully controlled so as to provide the feed gas not only at the elevated pressure but also at the desired reaction temperature so that any additional post-compression heating or cooling of the gas is minimized or even eliminated entirely. Alternatively, the temperature of the feed gas may be adjusted as required after compression. For example, the gas may be cooled to the desired reaction temperature by indirect heat exchange with a coolant, e.g. cooling water, or the gas may be heated to the desired reaction temperature by indirect heat exchange with a heat transfer fluid, e.g. steam.

In a particularly preferred embodiment, there is provided a method for removing $SO_2$ and $NO_x$ from a carbon dioxide feed gas comprising $SO_2$ and $NO_x$ as contaminants, said method comprising:

maintaining said carbon dioxide feed gas at an elevated pressure in contact with an alkaline sorbent in the presence of $O_2$ and water for a period of time sufficient to react said alkaline sorbent with $SO_2$, and to convert $SO_2$ to sulfuric acid and $NO_x$ to nitric acid, thereby producing at least:
  (i) a mixture of sorbent-derived sulfate and sorbent-derived sulfite;
  (ii) an aqueous mixed acid solution comprising sulfuric and nitric acids; and
  (iii) a $SO_2$-depleted, $NO_x$-lean carbon dioxide gas; and
separating said mixture of sorbent-derived sulfate and sorbent-derived sulfite, and said aqueous mixed acid solution from said $SO_2$-depleted, $NO_x$-lean carbon dioxide gas, or from a $SO_2$-depleted, $NO_x$-lean carbon dioxide gas derived therefrom, to produce a separated $SO_2$-depleted, $NO_x$-lean carbon dioxide gas.

An advantage of the present invention is that operating the $SO_2$/sorbent reaction at elevated pressure improves sorbent capacity and rate of adsorption. This improvement may lead to a reduction in the size of a typical adsorption vessel, with a corresponding reduction in capital cost, and/or a reduction in the amount of sorbent used.

In addition, since sorbent-derived sulfate is typically produced as the major component in a sulfate/sulfite mixture, the extent to which a forced oxidation reaction may be required to convert sulfite to sulfate may be reduced or even eliminated.

An advantage of preferred embodiments of the present invention is that $SO_2$ removal efficiency is improved for a given sour compression reactor size as sorbent is also used to remove $SO_2$.

An additional advantage of preferred embodiments of the present invention is that overall reactor volume, relative to the oxyfuel sour compression process described in US 2007/0122328 A1, may be reduced, resulting in a corresponding reduction in capital cost.

A further advantage of preferred embodiments of the present invention is that the amount of sulfuric acid waste that is produced is reduced since the sulfuric acid is used to assist the in situ oxidation of sulfite to sulfate.

Another advantage of preferred embodiments of the present invention is that the method works with concentrations of $NO_x$ as low as about 100 ppm. The concentration of $NO_x$ in the carbon dioxide feed gas may be from about 100 ppm to about 10,000 ppm. In embodiments where the carbon dioxide feed gas does not comprise $NO_x$ as a contaminant, the method may further comprise adding to the carbon dioxide gas at least a minimum amount of $NO_x$ required to provide significant assistance in converting $SO_2$ to sulfuric acid. In those embodiments, the amount of $NO_x$ added may be from about 100 ppm to about 10,000 ppm.

Production of aqueous acid solution by a condensation process usually results in the formation of acid mist which can be removed by passing the $SO_2$-depleted ($NO_x$-lean) carbon dioxide gas at elevated pressure through at least one fiber bed mist eliminator.

At least a portion of the $SO_x$-depleted ($NO_x$-lean) carbon dioxide gas produced by the present invention may be further processed. For example, the method of the present invention may be integrated with a carbon dioxide recovery and purification system operating at an elevated pressure. The elevated pressure of the present invention would usually be chosen such that the $SO_2$-depleted ($NO_x$-lean) carbon dioxide gas, or a gas derived therefrom, can be fed to the downstream system without any pressure adjustment (subject to any inherent pressure drop in the apparatus). However, it may be desirable to operate the method of the present invention at a "first" elevated pressure that is different from a "second" elevated pressure of the downstream system, in which case it would be necessary to adjust the pressure of the $SO_2$-depleted ($NO_x$-lean) carbon dioxide gas as appropriate prior to feeding the gas to the downstream process. The "first" and "second" pressures would typically conform to the preferred elevated pressure ranges disclosed above.

In preferred embodiments in which the gas comprises water vapor and "non-condensable" gases such as $N_2$, $O_2$ and Ar, the $SO_x$-depleted ($NO_x$-lean) carbon dioxide gas is usually dried, purified to remove "non-condensable" components, and compressed to a pipeline pressure from about 80 bar to about 250 bar (8 MPa to 25 MPa). The gas may then be stored in geological formations or in deep sea locations, or may be used in EOR processes.

The $SO_x$-depleted ($NO_x$-lean) carbon dioxide gas may be dried in a desiccant drier and then cooled to a temperature close to its triple point where "non-condensable" components such as $N_2$, $O_2$ and Ar (and Kr and Xe) are removed as gases in a vent stream. This process allows the $CO_2$ loss with the vent stream to be minimized by fixing the feed gas pressure at an appropriate level, e.g. from about 20 bar to about 40 bar (2 MPa to 4 MPa).

Suitable "non-condensable" components removal processes for use with the present invention are described in "*Oxyfuel conversion of heaters and boilers for $CO_2$ capture*" (Wilkinson et al., Second National Conference on Carbon Sequestration; May 5-8, 2003; Washington D.C.); US 2008/0173584 A1; US 2008/0173585 A1; and US 2008/0176174 A1, the disclosure of each of which is incorporated herein by reference. If the present method is used to remove $SO_2$ and $NO_x$ from flue gas produced in an oxyfuel combustion process and is integrated with one of these "non-condensable" components removal methods, then the integrated process typically leads to $CO_2$ purities of 95 mol. % to 99.99 mol. %, and to $CO_2$ recoveries of 90% to 99%.

The mixture of sorbent-derived sulfite and sulfate compounds may also be further processed after separation from the $SO_2$-depleted ($NO_x$-lean) carbon dioxide gas. For example, the mixture may be subjected to a conventional forced oxidation process to increase the proportion of sulfate in the mixture to, for example, more than 95%.

The apparatus comprises a compressor arrangement for compressing said carbon dioxide feed gas to an elevated pressure; a reactor system for maintaining the carbon dioxide feed gas at the elevated pressure in contact with an alkaline sorbent in the presence of $O_2$ for a period of time sufficient to produce $SO_2$-depleted carbon dioxide gas and a mixture of sorbent-derived sulfate and sorbent-derived sulfite; a conduit arrangement for feeding carbon dioxide feed gas at the elevated pressure from the compressor arrangement to the reactor system; and a separator system for separating the mixture of sorbent-derived sulfate and sorbent-derived sulfite from the $SO_2$-depleted carbon dioxide gas, or from a $SO_2$-depleted carbon dioxide gas derived therefrom, to provide a separated $SO_2$-depleted carbon dioxide gas.

The compressor arrangement may involve a single or multiple stages. If the compressor arrangement involves multiple stages, it may further comprise a heat exchanger (or intercooler) for cooling the gas at each interstage by indirect heat exchange against a coolant. If multistage compression intercoolers are present, then an arrangement (e.g. "knockout" pots) should be provided to capture and remove any condensate that may form during the cooling.

The reactor system provides a sufficient volume for a given flow rate within which the $SO_2$/sorbent and, preferably, the sour compression reactions may take place at elevated pressure. The reactor system may comprise two pressurizable reactor vessels; a first pressurizable reactor vessel for contacting the feed gas with the alkaline sorbent, and a second pressurizable reactor vessel for providing additional contact time to enable the sour compression reactions to occur. However, in preferred embodiments, the reactor system comprises a single pressurizable reactor vessel that provides not only free passage of solids under elevated pressure but also sufficient contact time for the sour compression reactions to occur. The reactor system usually comprises at least one pressurizable reactor vessel such as a pipe or duct; a tank; an absorption column; a wet scrubbing tower; fluidized or moving bed; packed tower or column; spray tower; and a Venturi scrubber. In preferred embodiments, the reactor system comprises gas/liquid/solid contact apparatus such as an absorption column or wet scrubbing tower. Where the reactor system comprises a countercurrent gas/liquid contact column, acid condensate may be removed from the bottom of the column, pumped, cooled and fed as reflux to the top of the column.

The reactor system may comprise a single pressurizable reactor vessel for operation at a single elevated pressure within the range of suitable pressures. In other embodiments, the reactor system may comprise at least two (same or different) pressurizable reactor vessels for operation at either the same or different elevated pressures.

The reactor system and the separator system may be within separate units or vessels, in which case the apparatus comprises a conduit arrangement for feeding $SO_2$-lean carbon dioxide gas and said mixture of sorbent-derived sulfite and sulfate compounds from said reactor system to said separator system. However, in preferred embodiments, the reactor system and the separator system are within the same unit or vessel.

Conventional separator systems include cyclones, baghouses, or other known gas solid separation devices, and produce a relatively dry sorbent. Optionally, wet scrubbing of the feed gas can be used to produce a sorbent byproduct in slurry form.

The apparatus is preferably for removing $NO_x$ in addition to $SO_2$ from the carbon dioxide feed gas which comprises $NO_x$ as a further contaminant. In such embodiments, an aqueous mixed acid solution of sulfuric and nitric acid is produced and separated from the $SO_2$-depleted carbon dioxide gas which is also $NO_x$-lean, or from a $SO_2$-depleted, $NO_x$-lean carbon dioxide gas derived therefrom, to provide a separated $SO_2$-depleted, $NO_x$-lean, carbon dioxide gas.

Since the proposed invention would substantially reduce the concentration of $SO_2$ in, or even eliminate $SO_2$ from, the flue gas from an oxyfuel combustion process, conventional equipment for FGD processes to remove $SO_2$ can be substantially reduced in size or even eliminated accordingly. In addition, since embodiments of the proposed invention would substantially reduce the concentration of $NO_x$ in the flue gas from such a process, conventional equipment for an SCR (e.g. a $deNO_x$ system) to remove $NO_2$ can also be substantially reduced.

The apparatus may further comprise a drier arrangement to dry the $SO_x$-depleted ($NO_x$-lean) carbon dioxide gas and produce dried $SO_x$-depleted ($NO_x$-lean) carbon dioxide gas; and a "non-condensable" components separation system to remove "non-condensable" components such as $O_2$, $N_2$ and Ar from the dried gas. Suitable combinations of a drier arrangement and an "non-condensable" components separation system are disclosed in US 2008/0173584 A1; US 2008/0173585 A1; and US 2008/0176174 A1.

Aspects of the invention include:

1. A method for removing $SO_2$ from a carbon dioxide feed gas comprising $SO_2$ as a contaminant, said method comprising:

maintaining said carbon dioxide feed gas at an elevated pressure in contact with an alkaline sorbent in the presence of $O_2$ for a period of time at least sufficient to react said alkaline sorbent with $SO_2$ and produce $SO_2$-depleted carbon dioxide gas and a mixture of sorbent-derived sulfate and sorbent-derived sulfite; and separating said mixture of sorbent-derived sulfate and sorbent-derived sulfite from said $SO_2$-depleted carbon dioxide gas, or from a $SO_2$-depleted carbon dioxide gas derived therefrom, to produce a separated $SO_2$-depleted carbon dioxide gas.

2. A method according to #1, wherein the elevated pressure is at least 2 bar (0.2 MPa).

3. A method according to #1 or #2, wherein the elevated pressure is no more than about 100 bar (10 MPa).

4. A method according to any of #1 to #3, wherein the elevated pressure is from about 5 bar to about 30 bar (0.5 MPa to 3 MPa).

5. A method according to any of #1 to #4, wherein said carbon dioxide feed gas is maintained in contact with said alkaline sorbent at a reaction temperature from about ambient temperature to no more than the acid dew point at said elevated pressure.

6. A method according to Claim 5, wherein said reaction temperature is no more than about 300° C.

7. A method according to any of #1 to #6, wherein said carbon dioxide feed gas, or a $SO_2$-lean carbon dioxide gas derived therefrom, is maintained at said elevated pressure in the presence of $NO_x$, $O_2$ and water for a period of time at least sufficient to convert $SO_2$ to sulfuric acid and $NO_x$ to nitric acid, said method further producing an aqueous mixed acid solution comprising nitric and sulfuric acids, for separation from said $SO_2$-depleted carbon dioxide gas, or from said $SO_2$-depleted carbon dioxide gas derived therefrom, to produce separated $SO_2$-depleted carbon dioxide gas.

8. A method according to #7, wherein $NO_x$ is present as a further contaminant in said carbon dioxide feed gas, said method removing $NO_x$ in addition to $SO_2$ from said carbon dioxide feed gas and producing said separated $SO_2$-depleted carbon dioxide gas that is also $NO_x$-lean.

9. A method according to #8, wherein said separated $SO_2$-depleted, $NO_x$-lean carbon dioxide gas comprises residual $SO_2$ and $NO_x$, and said separated gas is further processed to remove residual $SO_2$ and $NO_x$.

10. A method according to #8 or #9, wherein said separated $SO_2$-depleted, $NO_x$-lean carbon dioxide gas, or a $SO_2$-depleted, $NO_x$-lean carbon dioxide gas derived therefrom, is further processed to purify the carbon dioxide gas.

11. A method according to any of #7 to #10, wherein the period of time is no more than about 1000 seconds.

12. A method according to any of #7 to #11, wherein said period of time is from 5 seconds to about 600 seconds.

13. A method according to any of #1 to #12, wherein said mixture of sorbent-derived sulfate and sorbent-derived sulfite has a sulfate:sulfite ratio from more than 1:1 to 10000:1.

14. A method accordingly to any of #1 to #13, wherein said carbon dioxide feed gas is, or is derived from, flue gas produced by oxyfuel combustion of a fuel selected from the group consisting of hydrocarbon fuels and carbonaceous fuels.

15. A method for removing $SO_2$ and $NO_x$ from a carbon dioxide feed gas comprising $SO_2$ and $NO_x$ as contaminants, said method comprising:

maintaining said carbon dioxide feed gas at an elevated pressure in contact with an alkaline sorbent in the presence of $O_2$ and water for a period of time sufficient to react said alkaline sorbent with $SO_2$, and to convert $SO_2$ to sulfuric acid and $NO_x$ to nitric acid, thereby producing at least:

(i) a mixture of sorbent-derived sulfate and sorbent-derived sulfite;

(ii) an aqueous mixed acid solution comprising sulfuric and nitric acids; and (iii) a $SO_2$-depleted, $NO_x$-lean carbon dioxide gas; and separating said mixture of sorbent-derived sulfate and sorbent-derived sulfite, and said aqueous mixed acid solution from said $SO_2$-depleted, $NO_x$-lean carbon dioxide gas, or from a $SO_2$-depleted, $NO_x$-lean carbon dioxide gas derived therefrom, to produce a separated $SO_2$-depleted, $NO_x$-lean carbon dioxide gas.

16. Apparatus removing $SO_2$ from a carbon dioxide feed gas comprising $SO_2$ as a contaminant, said apparatus comprising:

a compressor arrangement for compressing said carbon dioxide feed gas to an elevated pressure;

a reactor system for maintaining said carbon dioxide feed gas at said elevated pressure in contact with an alkaline sorbent in the presence of $O_2$ for a period of time sufficient to produce $SO_2$-depleted carbon dioxide gas and a mixture of sorbent-derived sulfate and sorbent-derived sulfite; and a conduit arrangement for feeding carbon dioxide feed gas at said elevated pressure from said compressor arrangement to said reactor system;

a separator system for separating said mixture of sorbent-derived sulfate and sorbent-derived sulfite from said $SO_2$-depleted carbon dioxide gas, or from a $SO_2$-depleted carbon dioxide gas derived therefrom, to provide a separated $SO_2$-depleted carbon dioxide gas.

17. Apparatus according to #16, wherein said reactor system and said separator system are within separate units, said apparatus comprising a conduit arrangement for feeding $SO_2$-depleted carbon dioxide gas and a mixture of sorbent-derived sulfate and sorbent-derived sulfite from said reactor system to said separator system.

18. Apparatus according to #16, wherein said reactor system and said separator system are within a single unit.

19. Apparatus according to any of #16 to #18 for removing $NO_x$ in addition to $SO_2$ from said carbon dioxide feed gas comprising $NO_x$ as a further contaminant, to produce an aqueous mixed acid solution of sulfuric and nitric acid for separation in said separation system from said $SO_2$-depleted carbon dioxide gas which is also $NO_x$-lean, or from a $SO_2$-depleted, $NO_x$-lean carbon dioxide gas derived therefrom, to provide a separated $SO_2$-depleted, $NO_x$-lean, carbon dioxide gas.

20. Apparatus according to #19, wherein the reactor system comprises a single reactor for maintaining said carbon dioxide feed gas at said elevated pressure in contact with an alkaline sorbent in the presence of $O_2$ for a period of time sufficient to produce at least $SO_2$-lean carbon dioxide gas and a mixture of sorbent-derived sulfate and sorbent-derived sulfite, and for maintaining said carbon dioxide feed gas at said elevated pressure in the presence of $O_2$ and water for sufficient time to convert $SO_2$ to sulfuric acid and $NO_x$ to nitric acid.

21. Apparatus according to #19, wherein the reactor system comprises:
- a first reactor for maintaining said carbon dioxide feed gas at said elevated pressure in contact with an alkaline sorbent in the presence of $O_2$ for a period of time sufficient to produce at least $SO_2$-lean carbon dioxide gas and a mixture of sorbent-derived sulfate and sorbent-derived sulfite;
- a second reactor for maintaining said $SO_2$-lean carbon dioxide gas at said elevated pressure in the presence of $O_2$ and water for sufficient time to convert $SO_2$ to sulfuric acid and $NO_x$ to nitric acid; and
- a conduit arrangement for feeding at least $SO_2$-lean carbon dioxide gas from said first reactor to said second reactor.

Referring to FIG. 1, a stream 2 of flue gas (comprising about 73% carbon dioxide and water, $N_2$, $O_2$, Ar, $SO_2$ and $NO_x$ as contaminants) from an oxyfuel combustor system (not shown) is compressed in a compressor 4 to produce a stream 6 of compressed flue gas at an elevated pressure of about 10 bar (1 MPa). The temperature of the flue gas is raised during compression from ambient to a temperature of about 200° C.

Stream 6 is fed to a cooler 8 where it is cooled by indirect heat exchange against a coolant to produce a stream 10 of carbon dioxide feed gas at a temperature of about 75° C. and at the elevated pressure. In this example, the coolant is cooling water. However, the coolant could be another suitable fluid such as condensate within the system cycle of an upstream power boiler or a non-condensable vent stream from a downstream $CO_2$ recovery and purification system.

Stream 10 is fed to a reactor system comprising a first pressurized reactor vessel 12, together with a stream 14 of an alkaline sorbent ($CaCO_3$) in the form of a wet slurry. A portion of the $SO_2$ in the carbon dioxide feed gas is removed from the carbon dioxide feed gas by reaction with the sorbent in the slurry to produce calcium sulfite and calcium sulfate.

A stream 16 of carbon dioxide gas having reduced $SO_2$ and unreacted sorbent slurry with calcium sulfite and calcium sulfate, is fed from the first reactor vessel 12 to a second pressurized reactor vessel 18. The mixture is maintained in the second reactor 18 at the elevated pressure in the presence of $O_2$ and water for a period of time sufficient (~25 seconds) not only to convert $NO_x$ to nitric acid but also to convert residual $SO_2$ to sulfuric acid, by the reactions (iii) to (vi) mentioned above. A stream 20 of water from an external source may be added to the second reactor 18 during this step to facilitate production of an aqueous mixed acid solution of nitric and sulfuric acids.

A stream 22 comprising $SO_2$-depleted, $NO_x$-lean carbon dioxide gas, the aqueous mixed acid solution and solids including unreacted sorbent slurry, together with calcium sulfite and calcium sulfate, is fed to a separator system 24 and separated to produce a stream 26 of $SO_2$-depleted, $NO_x$-lean carbon dioxide gas and a stream 28 of the aqueous mixed acid solution and the solids. Stream 26 may be further processed as required to remove any remaining $SO_2$ and $NO_x$ and may then be fed to a drier arrangement and "non-condensable" gases separation train of a carbon dioxide recovery and purification system (not shown). The aqueous mixed acid solution and solids product may be used in a process (not shown) to produce gypsum.

Reactor vessels 12 and 18 are depicted in FIG. 1 as separate vessels. For convenience, the process has been modeled by the Inventors (see below) using such an arrangement for the reactor system. However, it must be appreciated that the reactor system could comprise a single reactor vessel designed to provide sufficient residence time at the elevated pressure not only for the $SO_2$/sorbent reactions to occur but also to convert $SO_2$ to sulfuric acid and $NO_x$ to nitric acid. Indeed, such an arrangement may well be preferred for some embodiments of the method. An example of such an arrangement is depicted in FIG. 2.

Figure 2:
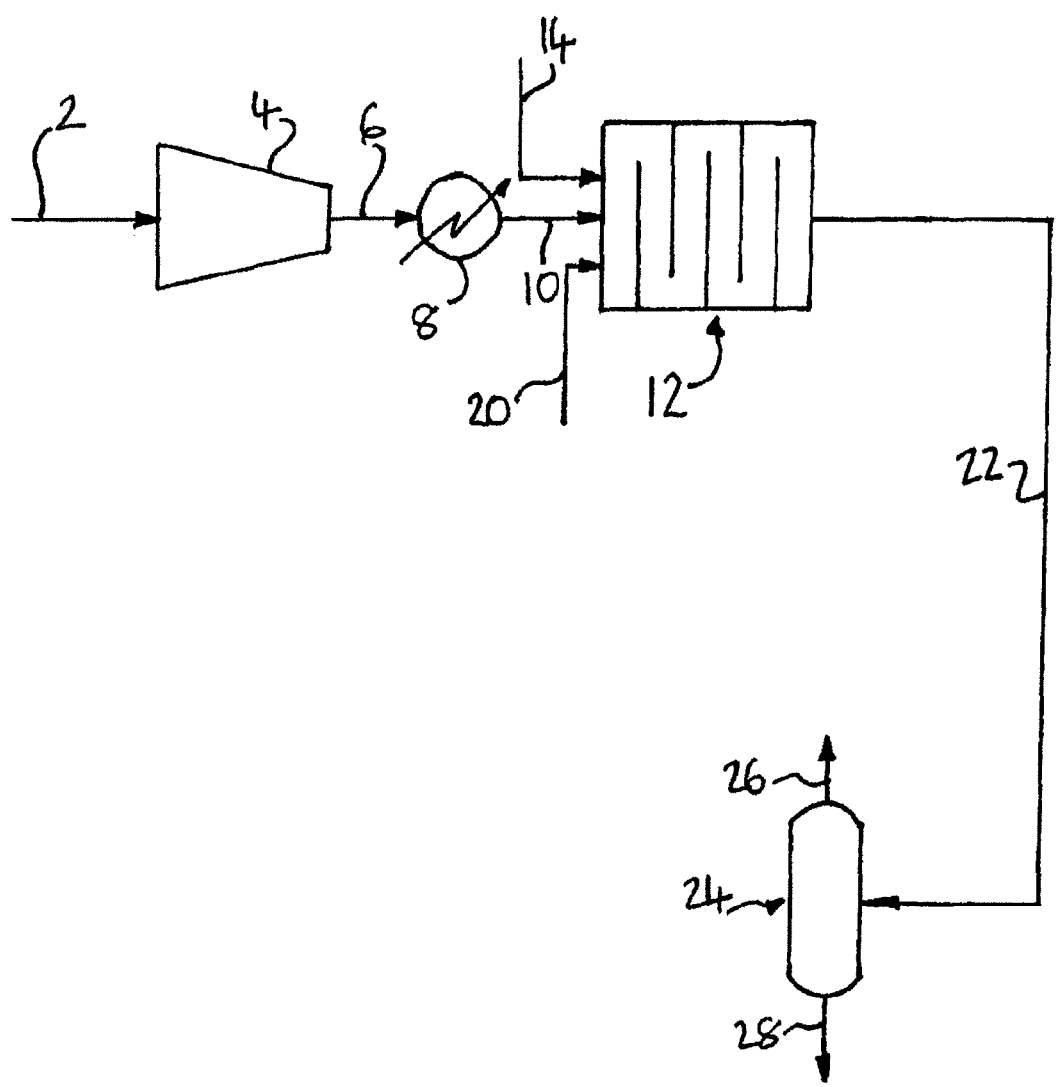
FIG. 2 is a flow sheet depicting a second embodiment of the present invention.

In addition, the reactor system and the separator system 24 are depicted in FIGS. 1 and 2 as separate apparatus features. However, it should be noted that depicting these apparatus features in this way should not be interpreted as meaning that these features must be separate. Some embodiments of the invention may indeed have a separator system 24 that is separate from the reactor system. However, in other embodiments, separation of the gas from the aqueous mixed acid solution and solids may take place in the reactor system itself, in which case streams 26 and 28 may be taken directly from the reactor vessel 12. An example of such an arrangement is depicted in FIG. 3.

Figure 3:
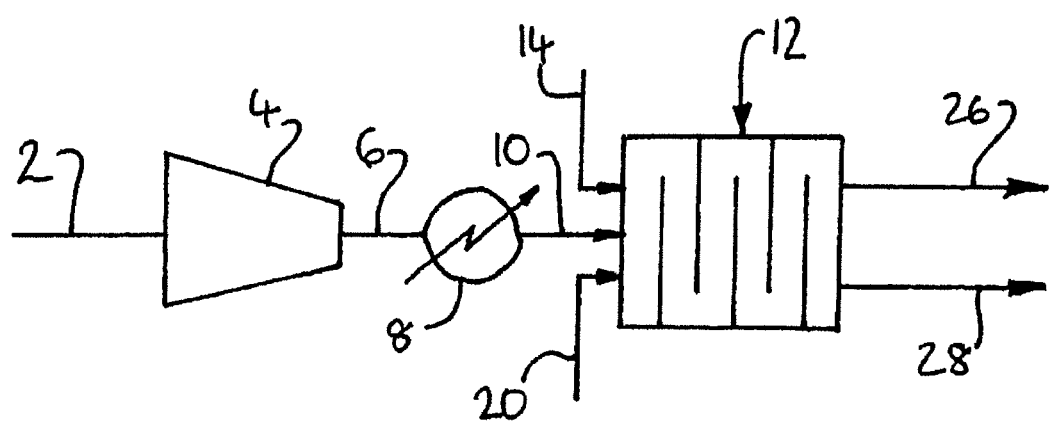
FIG. 3 is a flow sheet depicting a third embodiment of the present invention.

The features that are common between FIG. 1 and FIGS. 2 and 3 have been given the same numerical references.

Example 1

Computer simulations using the ASPEN™ Plus software (version 2006.5; © Aspen Technology, Inc.) have been carried out to compare the process depicted in FIG. 1 (Case B) with corresponding processes only involving sour compression reactions (Cases A and C).

In the simulations, the carbon dioxide feed gas had the following composition: 72.4% $CO_2$, 15.0% $H_2O$, 6.2% $N_2$, 4.5% $O_2$, 2% Ar, 1000 ppm $SO_2$, and 300 ppm NO (wet basis) (i.e. 85.2% $CO_2$, 7.3% $N_2$, 5.3% $O_2$, 2.2% Ar, 1175 ppm $SO_2$, and 350 ppm NO calculated on a dry basis). The elevated pressure was 10 bar (1 MPa) and the reaction temperature was 75° C. It was assumed that the sorbent removed 50% of the $SO_2$.

The results of the various simulations (Cases A through C) are provided in Table 2.

TABLE 2

| Case | $SO_2$ removal by adsorbent [rxr 12] % | $SO_2$ removal by sour compression, [rxr 18] % | Total $SO_2$ removal, % | $NO_x$ removal by sour compression, [rxr 18]) % | Sour compression residence time [rxr 18] seconds | Sour compression normalized throughput [rxr 18] $Nm_{feed}^3$/$h/m^3$ |
|---|---|---|---|---|---|---|
| A | 0 | 95.1 | 95.1 | 56.0 | 45.9 | 857 |
| B | 50 | 45.2 | 95.2 | 44.6 | 23.2 | 1714 |
| C | 0 | 88.1 | 88.1 | 39.8 | 23.3 | 1698 |

The results indicate that the method according to preferred embodiments of the present invention provides the same extent of $SO_2$ removal with a smaller sour compression reactor (compares Cases A and B). In addition, the results indicate that using sorbent to remove some of the $SO_2$ leads to a higher $SO_2$ removal efficiency at the same sour compression reactor size (compare Cases B and C).

Example 2

A qualitative comparison of operating conditions for sour compression (1 and 10 bar (0.1 MPa to 1 MPa), both at 50° C., 5 s contact time) for the same feed gas, indicates that the conditions make the sorbent more effective (see Table 3).

TABLE 3

|  | Pressure, atm (MPa) | |
| --- | --- | --- |
|  | 10 (1) | 1 (0.1) |
| Liquid phase % (molar) | 1.39E−01 | 2.97E−02 |
| Liquid phase mol %: |  |  |
| $SO_2$ | 3.69E−03 | 1.19E−03 |
| $NO_2$ | 1.88E−05 | 7.89E−08 |
| Total $NO_x$ species | 2.43E−02 | 1.11E−06 |
| $NO_2$/NO liquid phase molar ratio | 2.71E+00 | 1.00E−01 |
| Total acid species | 4.88E−01 | 7.42E−02 |
| Adsorbent contact time, second | 5.0 | 5.0 |
| Adsorbent normalized throughput, ($Nm^3_{feed}/h/m^3_{adsorption\ vessel}$) | 7990 | 690 |

The Inventors believe that the results of Examples 1 and 2 indicate that the sorbent is more effective at higher pressure (based on the understanding that, for solid sorbents, absorption occurs in liquid phase condensed on adsorbent surface and, for liquid sorbents, absorption occurs in the liquid phase containing the absorbent) because:
- higher pressure means higher percentage of stream present as liquid phase (i.e., more volume for reaction between $SO_2$ and adsorbent);
- higher pressure means higher concentration of $SO_2$ dissolved in liquid phase (i.e. higher driving force for reaction);
- higher pressure means higher concentration of total $NO_x$ species dissolved in liquid phase, and higher percentage of those species present as $NO_2$;
- higher pressure means higher concentration of acid species in liquid phase; and
- higher pressure means smaller vessel required for same contact time (i.e. higher normalized throughput at higher pressure).

It will be appreciated that the invention is not restricted to the details described above with reference to the preferred embodiments but that numerous modifications and variations can be made without departing form the spirit or scope of the invention as defined in the following claims.

The invention claimed is:

1. A method for removing sulfur dioxide ($SO_2$) from a carbon dioxide feed gas comprising $SO_2$ as a contaminant, said method comprising:
   maintaining said carbon dioxide feed gas at an elevated pressure in contact with an alkaline sorbent in the presence of oxygen ($O_2$) for a period of time at least sufficient to react said alkaline sorbent with $SO_2$ and produce $SO_2$-depleted carbon dioxide gas and a mixture of sorbent-derived sulfate and sorbent-derived sulfite; and
   separating said mixture of sorbent-derived sulfate and sorbent-derived sulfite from said $SO_2$-depleted carbon dioxide gas, or from a $SO_2$-depleted carbon dioxide gas derived therefrom, to produce a separated $SO_2$-depleted carbon dioxide gas.

2. The method of claim 1, wherein the elevated pressure is at least 2 bar (0.2 MPa).

3. The method of claim 1, wherein the elevated pressure is no more than about 100 bar (10 MPa).

4. The method of claim 1, wherein the elevated pressure is from about 5 bar to about 30 bar (0.5 MPa to 3 MPa).

5. The method of claim 1, wherein said carbon dioxide feed gas is maintained in contact with said alkaline sorbent at a reaction temperature from about ambient temperature to no more than the acid dew point at said elevated pressure.

6. The method of claim 5, wherein said reaction temperature is no more than about 300° C.

7. The method of claim 1, wherein said carbon dioxide feed gas, or a $SO_2$-lean carbon dioxide gas derived therefrom, is maintained at said elevated pressure in the presence of $NO_x$, $O_2$ and water for a period of time at least sufficient to convert $SO_2$ to sulfuric acid and $NO_x$ to nitric acid, said method further producing an aqueous mixed acid solution comprising nitric and sulfuric acids, for separation from said $SO_2$-depleted carbon dioxide gas, or from a $SO_2$-depleted carbon dioxide gas derived therefrom, to produce separated $SO_2$-depleted carbon dioxide gas.

8. The method of claim 7, wherein $NO_x$ is present as a further contaminant in said carbon dioxide feed gas, said method removing $NO_x$ in addition to $SO_2$ from said carbon dioxide feed gas and producing said separated $SO_2$-depleted carbon dioxide gas that is also $NO_x$-lean.

9. The method of claim 8, wherein said separated $SO_2$-depleted, $NO_x$-lean carbon dioxide gas comprises residual $SO_2$ and $NO_x$, and said separated gas is further processed to remove residual $SO_2$ and $NO_x$.

10. The method of claim 8, wherein said separated $SO_2$-depleted, $NO_x$-lean carbon dioxide gas, or a $SO_2$-depleted, $NO_x$-lean carbon dioxide gas derived therefrom, is further processed to purify the carbon dioxide gas.

11. The method of claim 7, wherein the period of time is no more than about 1000 seconds.

12. The method of claim 7, wherein said period of time is from 5 seconds to about 600 seconds.

13. The method of claim 1, wherein said mixture of sorbent-derived sulfate and sorbent-derived sulfite has a sulfate:sulfite ratio from more than 1:1 to 10,000:1.

14. The method of claim 1, wherein said carbon dioxide feed gas is, or is derived from, flue gas produced by oxyfuel combustion of a fuel selected from the group consisting of hydrocarbon fuels and carbonaceous fuels.

15. A method for removing $SO_2$ and $NO_x$ from a carbon dioxide feed gas comprising $SO_2$ and $NO_x$ as contaminants, said method comprising:
   maintaining said carbon dioxide feed gas at an elevated pressure in contact with an alkaline sorbent in the presence of $O_2$ and water for a period of time sufficient to react said alkaline sorbent with $SO_2$, and to convert $SO_2$ to sulfuric acid and $NO_x$ to nitric acid, thereby producing at least:
   (i) a mixture of sorbent-derived sulfate and sorbent-derived sulfite;
   (ii) an aqueous mixed acid solution comprising sulfuric and nitric acids; and
   (iii) a $SO_2$-depleted, $NO_x$-lean carbon dioxide gas; and
   separating said mixture of sorbent-derived sulfate and sorbent-derived sulfite, and said aqueous mixed acid solution from said $SO_2$-depleted, $NO_x$-lean carbon dioxide gas, or from a $SO_2$-depleted, $NO_x$-lean carbon dioxide gas derived therefrom, to produce a separated $SO_2$-depleted, $NO_x$-lean carbon dioxide gas.

16. Apparatus for removing $SO_2$ from a carbon dioxide feed gas comprising $SO_2$ as a contaminant, said apparatus comprising:

a compressor arrangement for compressing said carbon dioxide feed gas to an elevated pressure;

a reactor system for maintaining said carbon dioxide feed gas at said elevated pressure in contact with an alkaline sorbent in the presence of $O_2$ for a period of time sufficient to produce $SO_2$-depleted carbon dioxide gas and a mixture of sorbent-derived sulfate and sorbent-derived sulfite; and a conduit arrangement for feeding carbon dioxide feed gas at said elevated pressure from said compressor arrangement to said reactor system;

a separator system for separating said mixture of sorbent-derived sulfate and sorbent-derived sulfite from said $SO_2$-depleted carbon dioxide gas, or from a $SO_2$-depleted carbon dioxide gas derived therefrom, to provide a separated $SO_2$-depleted carbon dioxide gas.

17. The apparatus of claim 16, wherein said reactor system and said separator system are within separate units, said apparatus comprising a conduit arrangement for feeding $SO_2$-depleted carbon dioxide gas and a mixture of sorbent-derived sulfate and sorbent-derived sulfite from said reactor system to said separator system.

18. The apparatus of claim 16, wherein said reactor system and said separator system are within a single unit.

19. The apparatus of claim 16 for removing NO in addition to $SO_2$ from said carbon dioxide feed gas comprising $NO_x$ as a further contaminant, to produce an aqueous mixed acid solution of sulfuric and nitric acid for separation in said separation system from said $SO_2$-depleted carbon dioxide gas which is also $NO_x$-lean, or from a $SO_2$-depleted, $NO_x$-lean carbon dioxide gas derived therefrom, to provide a separated $SO_2$-depleted, $NO_x$-lean, carbon dioxide gas.

20. The apparatus of claim 19, wherein the reactor system comprises a single reactor for maintaining said carbon dioxide feed gas at said elevated pressure in contact with an alkaline sorbent in the presence of $O_2$ for a period of time sufficient to produce at least $SO_2$-lean carbon dioxide gas and a mixture of sorbent-derived sulfate and sorbent-derived sulfite, and for maintaining said carbon dioxide feed gas at said elevated pressure in the presence of $O_2$ and water for sufficient time to convert $SO_2$ to sulfuric acid and $NO_x$ to nitric acid.

21. The apparatus of claim 19, wherein the reactor system comprises:

a first reactor for maintaining said carbon dioxide feed gas at said elevated pressure in contact with an alkaline sorbent in the presence of $O_2$ for a period of time sufficient to produce at least $SO_2$-lean carbon dioxide gas and a mixture of sorbent-derived sulfate and sorbent-derived sulfite;

a second reactor for maintaining said $SO_2$-lean carbon dioxide gas at said elevated pressure in the presence of $O_2$ and water for sufficient time to convert $SO_2$ to sulfuric acid and NO to nitric acid; and a conduit arrangement for feeding at least $SO_2$-lean carbon dioxide gas from said first reactor to said second reactor.

\* \* \* \* \*

UNITED STATES PATENT AND TRADEMARK OFFICE
CERTIFICATE OF CORRECTION

PATENT NO. : 8,173,090 B2
APPLICATION NO. : 12/832204
DATED : May 8, 2012
INVENTOR(S) : Francis Peter Petrocelli et al.

Page 1 of 1

It is certified that error appears in the above-identified patent and that said Letters Patent is hereby corrected as shown below:

IN THE CLAIMS:

Column 21, Line 29

In Claim 19 delete "NO" and insert -- $NO_x$ --

Column 22, Line 27

In Claim 21 delete "NO" and insert -- $NO_x$ --

Signed and Sealed this
Thirtieth Day of April, 2013

Teresa Stanek Rea
*Acting Director of the United States Patent and Trademark Office*